United States Patent
Sun et al.

(10) Patent No.: US 11,785,486 B1
(45) Date of Patent: Oct. 10, 2023

(54) TELECOMMUNICATION CHANNEL EVALUATION TOOL

(71) Applicant: CABLE TELEVISION LABORATORIES, INC., Louisville, CO (US)

(72) Inventors: Ruoyu Sun, Westminster, CO (US); Mark J. Poletti, Louisville, CO (US); Zaheer Syed, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 50 days.

(21) Appl. No.: 17/116,967

(22) Filed: Dec. 9, 2020

Related U.S. Application Data (60) Provisional application No. 63/022,264, filed on May 8, 2020, provisional application No. 62/945,659, filed on Dec. 9, 2019.

(51) Int. Cl.
*H04W 24/08* (2009.01)
*H04W 24/10* (2009.01)

(52) U.S. Cl.
CPC .......... *H04W 24/08* (2013.01); *H04W 24/10* (2013.01)

(58) Field of Classification Search
None
See application file for complete search history.

(56) References Cited

U.S. PATENT DOCUMENTS

2019/0115950 A1* 4/2019 Kakinada ............. H04B 1/7136
2021/0259032 A1* 8/2021 Selea .................... H04W 24/08

FOREIGN PATENT DOCUMENTS

TW 201427444 A * 7/2014 ............ H04W 16/14

* cited by examiner

*Primary Examiner* — Adolf Dsouza
(74) *Attorney, Agent, or Firm* — Elevated IP, LLC (57) ABSTRACT

A telecommunication radio frequency channel evaluation tool, software and method of creating the tool are disclosed. The tool identifies restrictions associated with incumbent users of spectral bandwidth within a shared spectrum and assesses channel availability for third party transmitters in the shared spectrum. Generally, the tool comprises a database of incumbent users' locations and corresponding protection areas within a geographic area, population density within the geographic area, and restrictions on third party transmissions associated with each of the incumbent users.

18 Claims, 9 Drawing Sheets

TELECOMMUNICATION CHANNEL EVALUATION TOOL

CROSS-REFERENCE TO RELATED APPLICATIONS

This application claims the benefit of and priority to U.S. Provisional Patent Application Nos. 62/945,659, filed Dec. 9, 2019, and 63/022,264, filed May 8, 2020, each of which is hereby incorporated herein by reference in its entirety.

STATEMENT REGARDING FEDERALLY SPONSORED RESEARCH

None.

BACKGROUND

The FCC has allocated 150 MHz of spectrum in the 3.5-GHz band for the Citizens Broadband Radio Service (CBRS) with a new 3-tiered approach to share spectrum with incumbents. The 150-MHz bandwidth is divided into licensed channels for Priority Access License (PAL) use and "unlicensed with rules" channels for General Authorized Access (GAA) use. All licenses will use boundaries based on U.S. counties or equivalents. A Spectrum Access System (SAS) is used to protect all incumbents and manage spectrum.

The mutual impact between incumbents and PAL/GAA users is a complicated and critical issue. The CBRS band is occupied by six incumbents used by the military (coastal and inland radars), civilian services such as the fixed satellite service (FSS) and wireless Internet service providers (WISPs), and research bodies (national radio quiet zones). The six incumbent entities are distributed across the United States; they will overlap with PAL and GAA channels based on their geographic locations and be different per U.S. county. Thus, channel occupancy will vary by county and will require different levels of permanent or dynamic protection, which will ultimately encumber CBRS channel availability. In addition, because of the dynamic, frequency- and/or time-dependent nature of some of the incumbents, some counties will experience some channel instability (i.e., periods of channel unavailability requiring transfer to another channel). The 15 channels will not all be available in all areas of the United States. These aspects of CBRS will impact business case strategies, PAL auction planning, and CBRS network operation.

SUMMARY

The present disclosure generally relates to tools that evaluate the impact of telecommunication incumbent users, who are entitled to interferenceless use of a portion of spectral bandwidth, on new users in the same bandwidth. While exemplified with respect to the FCC allocation in the 3.5-GHz band for the CBRS in the United States, the telecommunication channel evaluation tools disclosed herein may be adapted for other bands, geographic regions (e.g., countries), and incumbent-specific restrictions. Further, the tool may generate data in a variety of file types for convenient visualization and manipulation. One tool exemplified herein comprises one or more of the following features: a database of all incumbents in the CBRS band by U.S. county; channel occupancy by U.S. county; database and visual KML files used to conduct general and customized analysis; and analysis results including channel occupancy by area and by population and the number of available channels.

In an aspect, a telecommunication channel evaluation tool for identifying restrictions associated with incumbent users of spectral bandwidth within a shared spectrum and assessing channel availability for third party transmitters in the shared spectrum comprises: a database comprising incumbent users' locations and corresponding protection areas within a geographic area, population density within the geographic area, and restrictions on third party transmissions associated with each of the incumbent users.

In an embodiment, the telecommunication channel is a radio frequency (RF) channel. In an embodiment, the channel is in the citizens broadband radio service (CBRS) band and the incumbent users are CBRS incumbent users.

In an embodiment, the restrictions on third party transmissions comprise transmission frequency restrictions, transmission power level restrictions, and/or transmission location restrictions. In an embodiment, the restrictions comprise one or more extension zones. For example, the transmission frequency, transmission power level, and/or transmission location restrictions may change (e.g., become more stringent or less stringent) within a series of concentric geographic zones extending spatially from the source of an incumbent user's transmitter ("extension zones").

In an embodiment, the database further comprises size of the geographic area, channel occupancy, number of incumbents that impact the third party transmission in a geospatial area, type of incumbent, quantification of area and population affected by the restrictions associated with each of the incumbent users, and/or restrictions in neighboring geographic areas (e.g., near borderlines with neighboring countries).

In an embodiment, the geographic area is the mainland United States of American, Alaska, Hawaii, Puerto Rico, Virgin Islands, Northern Mariana Islands, American Samoa and/or Guam.

In an embodiment, data within the database are quantified at country level, state level, county level and/or ZIP Code Tabulation Areas (ZCTAs).

In an embodiment, data within the database is presented as a spreadsheet, a graphical representation, or a geospatial representation. The geospatial representation may, for example, be a physical or electronic geographic map, where the geographic map provides a two-dimensional or three-dimensional representation of terrain.

In an embodiment, an incumbent user is a type of incumbent user selected from the group consisting of a military user, a civilian service, a wireless Internet service provider (WISP), and a research body.

In an embodiment, a channel evaluation tool further comprises an impact rating assigned to at least a portion of the geographic area.

In an aspect, a method of creating a telecommunication channel evaluation tool comprises: identifying (i) incumbent users, (ii) restrictions limiting third party transmissions associated with each of the incumbent users, (iii) a location and extended protection zones of each incumbent user within a geographic area, and (iv) a population density within the geographic area; and compiling (i)-(iv) into a database.

In an embodiment, the method further comprises: determining (v) a size of the geographic area, (vi) channel occupancy, (vii) a quantity of area and population affected by the restrictions associated with each of the incumbent users, and/or (viii) restrictions in neighboring geographic areas; and compiling (v)-(viii) into the database.

In an embodiment, the method further comprises assessing channel availability for third party transmitters based on the restrictions associated with each of the incumbent users.

In an embodiment, the method further comprises presenting data within the database as a spreadsheet, a graphical representation, or a geospatial representation, such as but not limited to a physical or electronic geographic map, where the geographic map provides a two-dimensional or three-dimensional representation of terrain.

In an embodiment, the method further comprises assigning an impact rating to at least a portion of the geographic area.

BRIEF DESCRIPTION OF THE DRAWINGS

Illustrative embodiments of the present invention are described in detail below with reference to the attached drawings.

DETAILED DESCRIPTION

The telecommunication channel evaluation tools disclosed herein may be implemented in various forms as a matter of design choice. For example, a telecommunication channel evaluation tool can be a physical resource, such as but not limited to a manual, a book, or a map containing data related to the impact an incumbent user will have on the ability of a third party to transmit within a shared spectrum. Alternatively or in addition, when a telecommunication channel evaluation tool is implemented in software, the tool comprises instructions executable by a processor that gather, calculate, and/or display data related to the impact an incumbent user will have on the ability of a third party to transmit within a shared spectrum. For example, a software version of a telecommunication channel evaluation tool may be available as a web-based tool, a desktop or a mobile application, and/or an electronic spreadsheet. In some embodiments, software may include instructions for updating data of the channel evaluation tool automatically (e.g., at specified intervals) or upon receipt of a user command.

Figure 13:
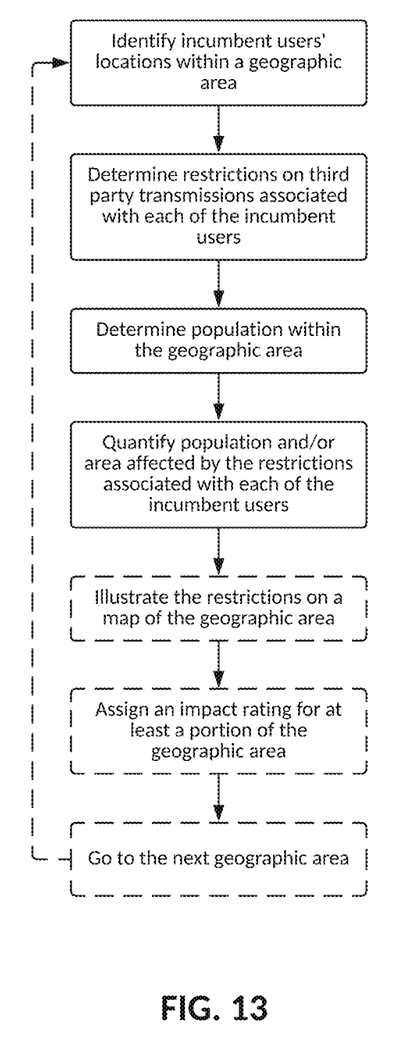
FIG. 13 provides a flowchart illustrating exemplary steps performed (e.g., by a processor) to create a telecommunication channel evaluation tool according to the present disclosure.

FIG. 13 provides a flowchart illustrating exemplary steps performed (e.g., by a processor executing instructions stored on a non-transitory computer-readable medium) to create a telecommunication channel evaluation tool disclosed herein. As shown, dashed features indicate optional steps.

The tools and methods disclosed herein are further illustrated by the following Examples. These Examples are for illustrative purposes only and are not intended to limit the disclosure.

EXAMPLE 1

A CBRS channel evaluation tool that uses Google™ KML files was developed to analyze channel occupancy by incumbents at the U.S. county level (used for CBRS license boundaries) with population and area. The tool provides channel occupancy per county for the two user tiers: PAL and General Authorized Access (GAA) channels. The tool and the KML files can be used for analysis in several aspects of CBRS network deployment including business case analysis, deployment planning, and operations. This analysis can be done at the national, regional, market, or county level and can be customized to an operator's needs.

For example, the tool can be used for the following:
planning PAL auction strategy;
evaluating channel availability at the county level, with population and area data, for business case analyses;

using PAL/GAA channel availability information for deployment planning;

evaluating PAL channel stability near (dynamic) incumbents; and carrying out competitive analysis (i.e., to identify mobile operator markets of spectrum deficiency where they are likely to pursue PALs and to compare with internal operator target market opportunities).

An example set of results from a study conducted over the entire United States shows the following observations:

the 15 channels are entirely unoccupied in 25% of all counties (26% of U.S. area and 9% of the population);

WISPs partially occupy 3-5 GAA channels in 24% of all counties (19% of U.S. area and 20% of the population);

CBRS channels are partially occupied by dynamic incumbents in 31% of all counties (40% of U.S. area and 31% of the population);

up to 15 CBRS channels are occupied by permanent incumbents in 3% of all counties (2% of U.S. area and 2% of the population); and up to 15 CBRS channels are occupied by permanent and dynamic incumbents in 17% of all counties (13% of U.S. area and 38% of the population).

It should be noted that this analysis represents a 2-dimensional worst-case study based on FCC-defined boundaries and definitions. Other versions of the tool can use a 3-dimensional GIS-based tool to conduct more complex analyses, thereby providing more accurate and granular results (i.e., at sub-county level such as down to a 30-m pixel). These tools can be used to collaborate with an operator's SAS vendor to understand potential risks and tradeoffs of CBRS channel occupancy in targeted market opportunities.

EXAMPLE 2

A first version of the CBRS channel evaluation tool was created based on following assumptions:

population analysis is based on U.S. Census 2017 estimates with uniform distribution in a county;

Grandfathered Wireless Protection Zones (GWPZs) are based on license holders as end of Q1 2020;

a total of 99 FSS earth stations (ESs) were evaluated; and

FCC/NTIA boundary (protection distance) criteria are used for DPAs, FSS earth stations, and other incumbents.

The tool evaluates the impact of the multiple incumbents utilizing FCC and NTIA guidance and boundaries and presents geographic analysis, recommendations, and strategic deployment approaches.

Approach

The CBRS channel evaluation tool uses county (or equivalent) boundaries to align with the FCC PAL Auction rule modification published in Q4 2018. The model assumes 70 MHz worth of PAL channels and the rest are GAA channels. The tool considers 3,233 U.S. counties (3,108 on the mainland), including Alaska, Hawaii, Puerto Rico, and other territories. The tool uses the following approach:

Extend incumbent zones by distances required by the FCC and NTIA.

Calculate union of incumbent overlap across an area (e.g., state or country).

Create contours of impacted area in a KML file that shows how each county is impacted by incumbents.

Create a user-friendly MS Excel file that includes incumbent overlap area and impacted population, impacted frequency range for individual PAL and GAA channels, and the ability to sort and filter as desired.

Provide ratings and recommendations.

Layers of Incumbents

Figure 1:
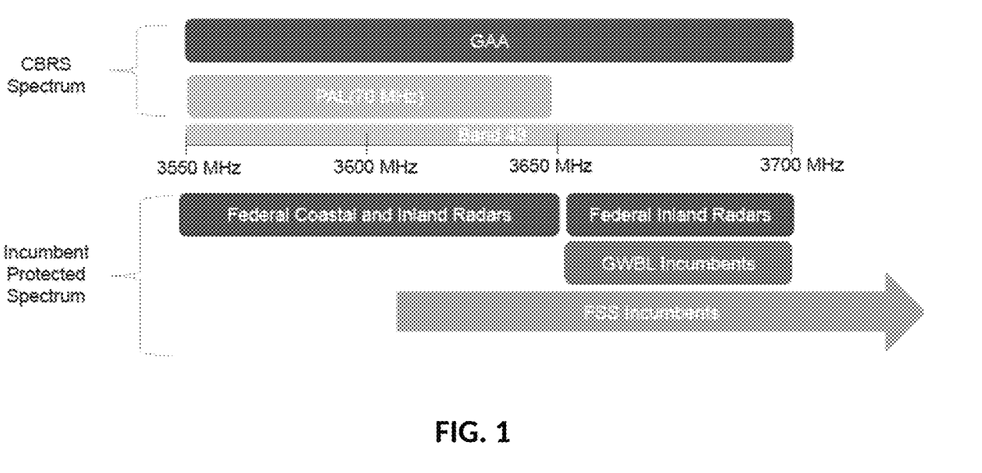
FIG. 1 shows spectrum used by incumbent, PAL, and GAA channels in the CBRS band. Incumbent Protected Spectrum: Top-Dynamic Protection Areas (DPAs) and Exclusion Zones (Ezones); middle—Grandfathered Wireless Protection Zones (GWPZs); bottom—Fixed Satellite Service (FSS) earth stations, Quiet zones (Qzones).

The six CBRS incumbents are (1) E-DPAs (environmental sensing capability [ESC] dynamic protection areas); (2) P-DPAs (portal DPAs); (3) ground-based exclusion zones (EZones); (4) national radio quiet zones (QZones), (5) FSS ESs; and (6) grandfathered wireless protection zones (GWPZs). E-DPAs are used for coastal radar, and P-DPAs and EZones are used for inland radar. Each GWPZ corresponds to a grandfathered wireless broadband license (GWBL) owned by a WISP and is permanently protected. EZones, QZones, and FSS ESs are also permanently protected; they are collectively classified as permanent protection zones (PPZs). They are considered separately from GWPZs because the frequencies of GWPZs range from 3650 to 3700 MHz and do not overlap with PALs. E-DPAs and P-DPAs are classified together in the DPA category. DPAs are enforced by ESC sensors, which detect incumbent activities inside DPAs not available to public and notify the SAS. The SAS then adjusts the frequency and radiating power of nearby Citizens Broadband Radio Service Devices (CBSDs). DPAs are expected to be active across a small subset of channels during incumbent activity, impacting CBSDs within a neighborhood of interference threshold defined by the NTIA. DPAs are "dynamic" in both frequency and time, whereas PPZs and GWPZs are permanently protected over a fixed frequency range. The spectrum of incumbent, PAL, and GAA channels are illustrated in FIG. 1. The six incumbents are summarized in Table 1.

TABLE 1

SUMMARY OF INCUMBENTS

| Incumbents | Number | Frequency (MHz) | Impact No. of CBRS 10-MHz channels | In time | Risk |
| --- | --- | --- | --- | --- | --- |
| E-DPAs | 105 | 3550-3650 | 1 or 2 | Dynamic* | Medium (PAL/GAA) |
| P-DPAs | 11 | 3550-3650 | 1 or 2 | Dynamic* | Medium (PAL/GAA) |
| EZones | 3 | 3650-3700 | 1 or 2 | Permanent | Low (GAA only) |
|  | 39 | 3550-3650 | 10 | Permanent | High (PAL/GAA) |
| QZones | 16 | 3550-3700 | 15 | Permanent | High (PAL/GAA) |
| FSS ES | 99 | 3600-3700 | 2-10 | Permanent | High (PAL/GAA) |
| GWPZs | 2189** | 3650-3700 | 1-5 | Permanent | Low (GAA only) |

*Small portion in time based on ESC or portal.
**As of the end of Q1 2020.

E-DPAs

Figure 2:
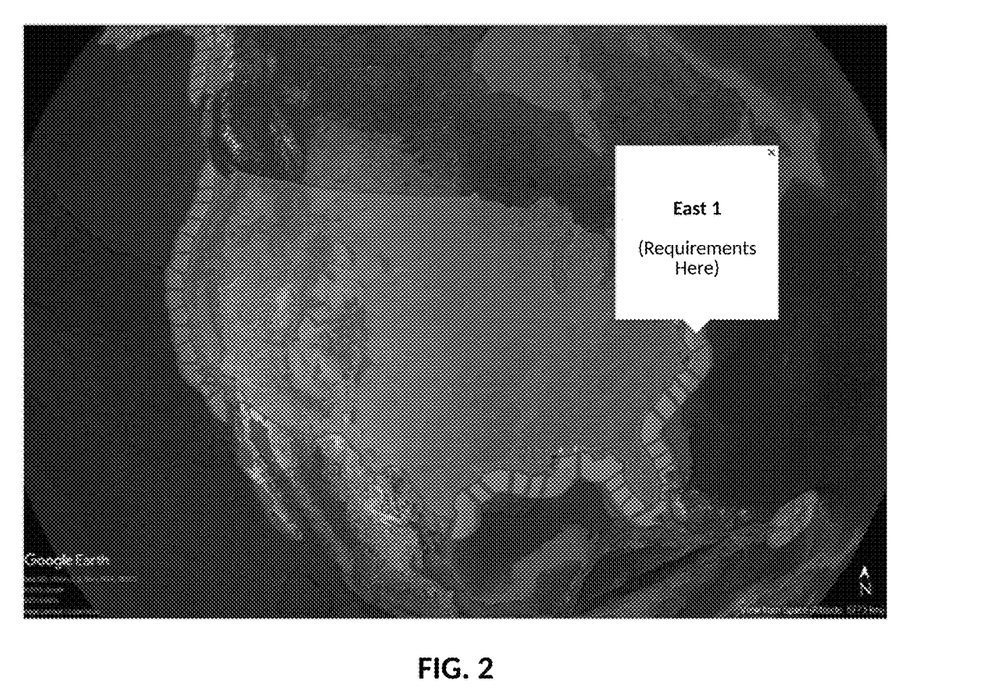
FIG. 2 provides a geospatial representation of data from a telecommunication channel evaluation tool, according to the present disclosure, showing environmental sensor capability DPAs (ESC-DPAs or E-DPAs) near coast lines with an inset of requirements for E-DPA East 1 near Virginia.
Figure 3:
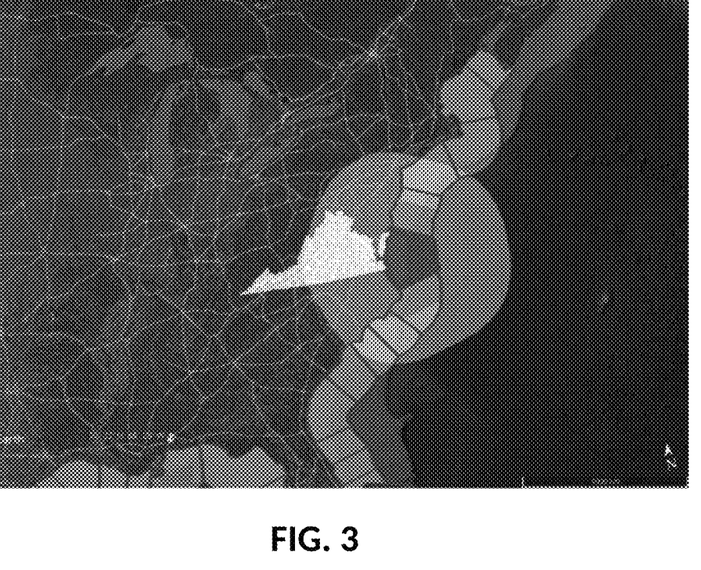
FIG. 3 provides a geospatial representation of data from a telecommunication channel evaluation tool, according to the present disclosure, showing extended protection zones for E-DPA East 1 for Category B (Cat-B) out-of-band (OOB) base station (center zone), Category A (Cat-A) co-channel base station (middle zone), and Cat-B co-channel base station (outer zone).

There are 105 E-DPAs, as defined by the NTIA, along the coasts of the mainland United States, Alaska, Hawaii, Puerto Rico, Guam, etc., beginning 10 km from the coastal lines; see the polygons in FIG. 2. All the E-DPAs protect the 3550-3650 MHz frequency range. For example, the E-DPA East 1 near Virginia and corresponding requirements are listed in the white table in FIG. 2. The impact of an E-DPA is determined by the distance, d, between a CBSD and the DPA boundary: (1) d>368 km: no impact; (2) d≤368 km: aggregated signal power density of all Cat-B co-channel CBSDs shall not exceed −144 dBm/10 MHz; (3) d≤150 km: aggregated signal power density of all Cat-A co-channel CBSDs shall not exceed −144 dBm/10 MHz; (4) d≤25 km:

aggregated signal power density of all Cat-B out of band (OOB) CBSDs shall not exceed −144 dBm/10 MHz. Note that the 25 and 150 km distances for Cat-B OOB and Cat-A co-channel CBSDs are constants for all E-DPAs and P-DPAs, but the protection distance for Cat-B co-channel CBSD varies from 128 to 416 km. The E-DPA East 1 is extended by these three distances, as shown in FIG. 3 by the center zone, middle zone and outer zone shading. The boundaries of all the counties or equivalents in Virginia are also shown in the Google Earth® view so that the area of overlap between a county and an extended protection zone is clear.

P-DPAs

Figure 4:
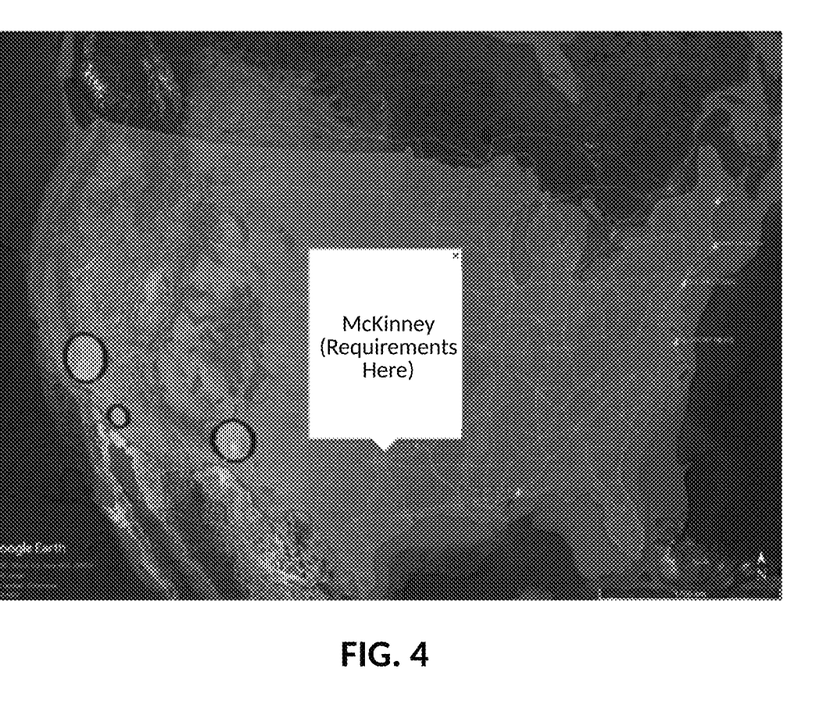
FIG. 4 provides a geospatial representation of data from a telecommunication channel evaluation tool, according to the present disclosure, showing Portal-DPAs (P-DPAs) and an inset of requirements for one P-DPA in the U.S. mainland.
Figure 5:
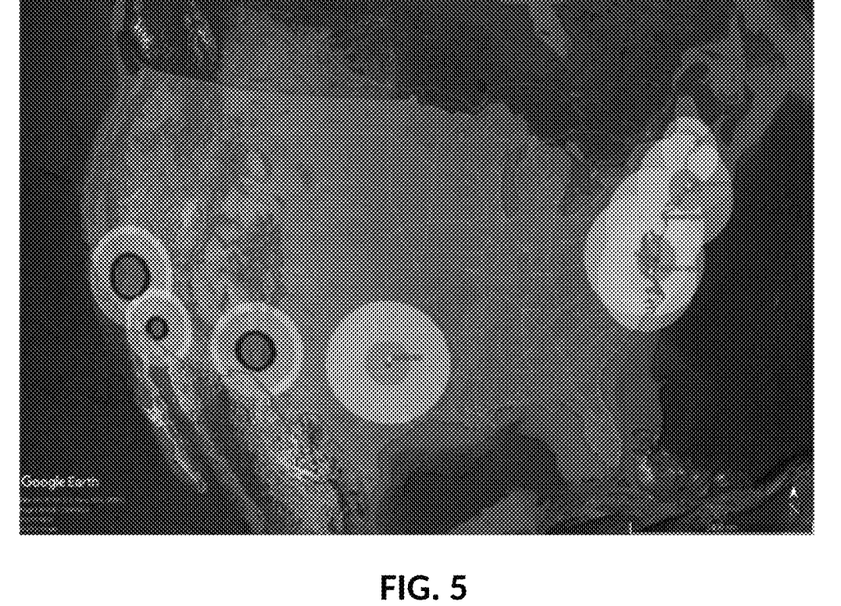
FIG. 5 provides a geospatial representation of data from a telecommunication channel evaluation tool, according to the present disclosure, showing extended P-DPA protection zones for the P-DPAs in FIG. 4 for Cat-B OOB (dark circles), Cat-A co-channel (medium-dark circles), and Cat-B co-channel (light circles).

There are 11 P-DPAs, as defined by the NTIA: ten in the mainland (see FIG. 4) and one in Hawaii. Similarly to E-DPAs, P-DPAs have three distances of extended protection defined for Cat-B co-channel, Cat-A co-channel, and Cat-B OOB CBSDs (FIG. 5).

Ground-Based Exclusion Zones

Figure 6:
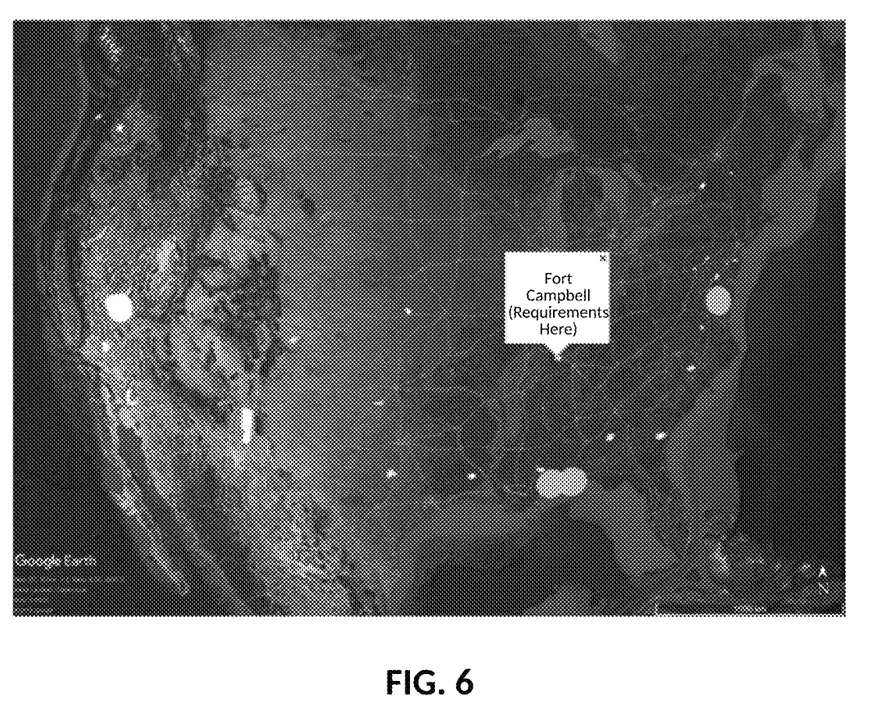
FIG. 6 provides a geospatial representation of data from a telecommunication channel evaluation tool, according to the present disclosure, showing ground-based exclusion zones.

Protection rules for exclusion zones are provided in 47 CFR §96.15. There are 39 EZones with a protected frequency range of 3550-3650 MHz and an area range of 28-25,534 km$^2$. Another 3 EZones, defined in 47 CFR §90.1331, have a protected frequency range of 3650-3700 MHz and a radius of 80 km (circles in FIG. 6). No extension is required, so CBSDs could transmit at the boundaries of these EZones.

Quiet Zones

In total, 16 quiet zones that impact the 150-MHz CBRS band are defined in 47 CFR §1.924, including the National Radio Astronomy Observatory (NRAO) site at Green Bank, W. Va; Department of Commerce research laboratories at Table Mountain in Boulder, Colo.; and 14 FCC-protected field offices listed in 47 CFR §0.121. The Green Bank QZone is a rectangular area that covers 33,772 km$^2$, bounded by N 39°15'0.4" to the north, W 78°29'59.0" to the east, N 37°30'0.4" to the south, and W 80°29'59.2" to the west. Transmission on any frequency is banned inside the QZone. The Table Mountain QZone is centered at N 40° 07'49.9" and W 105° 14'42.0". No transmission is allowed within 2.4 km (1.5 mi); only a signal with power less than 50 W is allowed within 4.8 km (3 mi); no more than 1 kW can be transmitted within 16 km (10 mi), and no more than 25 kW is allowed within 80 km (50 mi). Because the maximum EIRP (effective isotropic radiated power) of a Cat-B CBSD is 47 dBm/10 MHz, which corresponds to 50 W for a 10-MHz channel, the Table Mountain QZone is extended by 4.8 km in the CBRS channel evaluation. The 14 FCC field offices have the same requirements as the Table Mountain QZone, so they are extended by 4.8 km as well.

FSS Earth Stations

Figure 7:
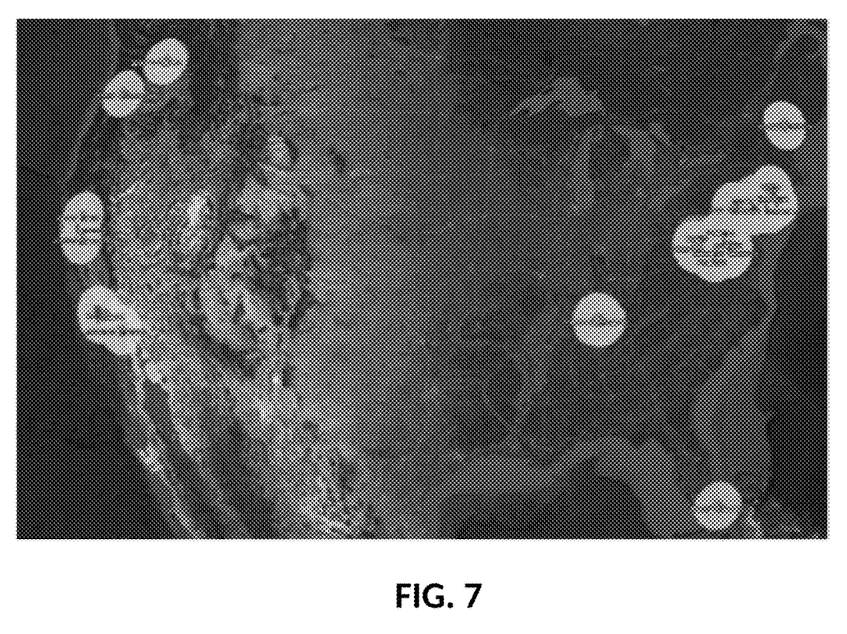
FIG. 7 provides a geospatial representation of data from a telecommunication channel evaluation tool, according to the present disclosure, showing FSS earth stations with protection distances of 150 km for co-channel Citizen Broadband Radio Service Devices (CBSDs, light circles) and 40 km for adjacent channel CBSDs (darker circles).

The FCC has multiple regulations for protecting FSS earth stations from various radio links in various bands. The CBRS channel evaluation incorporates rules from 47 CFR §96.17(a), which specifies the protection of earth stations in the 3600-3700 MHz band. For the FCC earth stations, aggregated interfering signal from co-channel CBSDs within 150 km shall not exceed a median root mean square (RMS) value of −129 dBm/MHz. Aggregated interfering signal from adjacent channel (blocking) CBSDs within 40 km shall not exceed a median RMS value of −60 dBm/MHz. The CBRS channel evaluation tool analyzed 99 FSS earth stations (FIG. 7), with each using the protections described above.

Grandfathered Wireless Protection Zones

Figure 8:
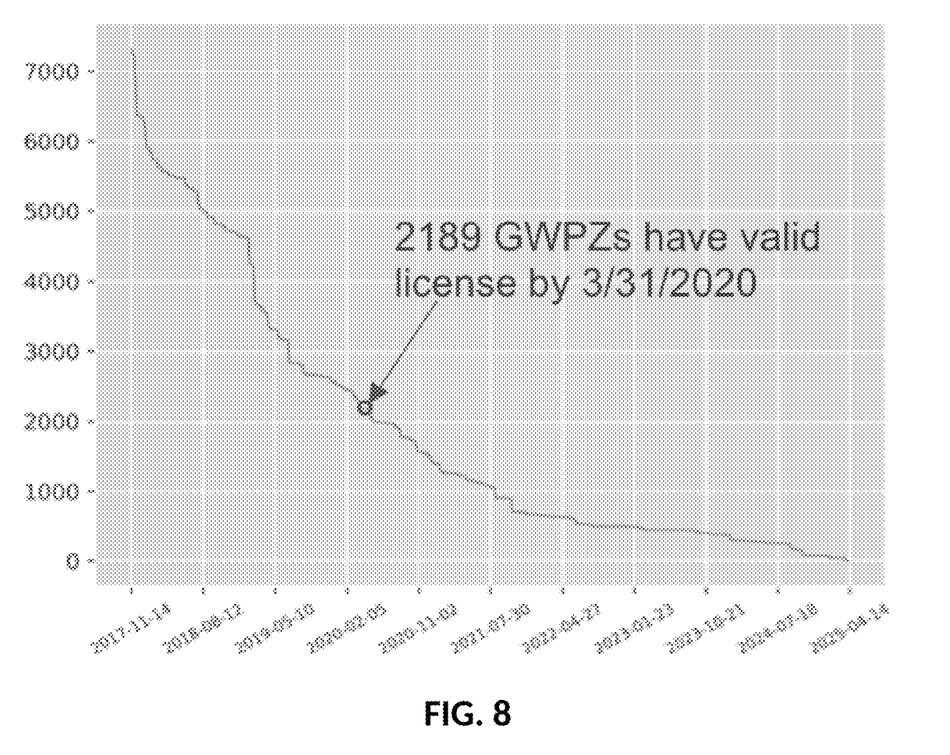
FIG. 8 is a graphical representation of data from a telecommunication channel evaluation tool, according to the present disclosure, showing the number of GWPZs with a valid license over time.
Figure 9:
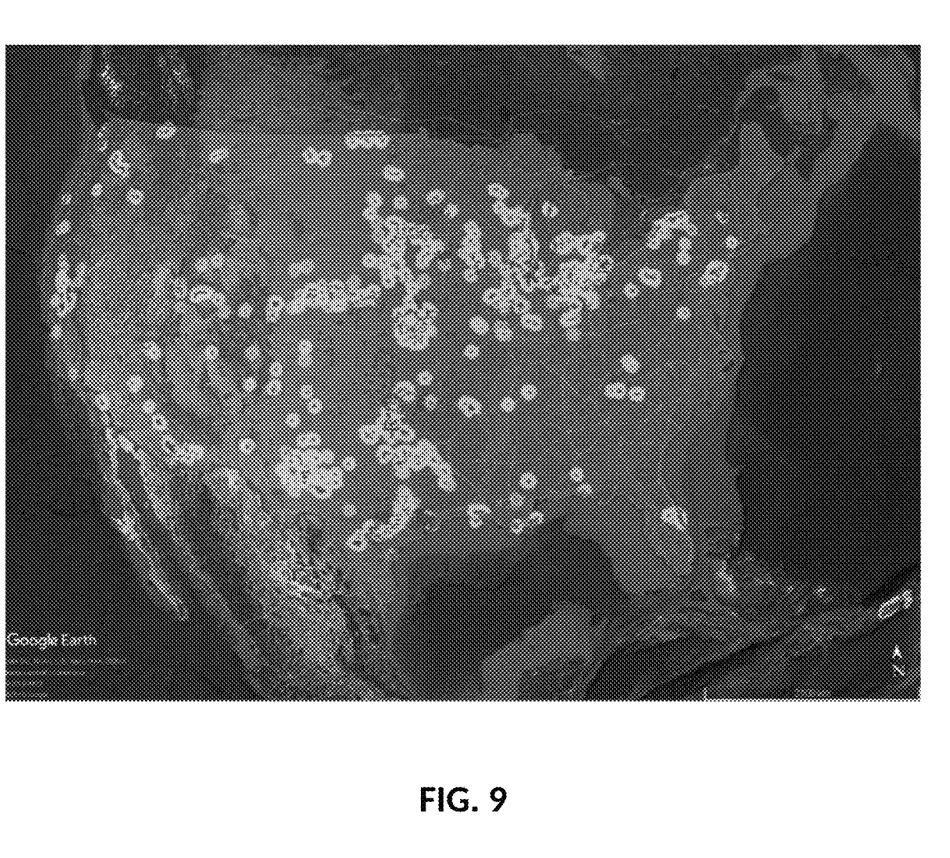
FIG. 9 provides a geospatial representation of data from a telecommunication channel evaluation tool, according to the present disclosure, showing GWPZs (7,310 dark dots) and extended GWPZs (2,189 lighter circles) still valid after Mar. 31, 2020.

Protection requirements for GWPZs are described in 47 CFR §96.21, §90.1307, and §90.1338. According to the WINNF SAS technical specification and as agreed upon by the FCC, NTIA, and Department of Defense, each GWBL needs to extend by 40 km. A list of 7,310 GWPZs was released, and the licenses are expiring over time. As shown in FIG. 8, only 2,189 GWPZs will remain by the end of Q1 2020, which is the expected initial commercial deployment of PAL channels. All 7,310 GWPZs and the 2,189 GWPZs valid at the end of Q1 2020, with their 40-km zone extensions, are shown in FIG. 9.

Rating Scale

The initial approach for this evaluation implements a rating scale from 0 to 4 to measure the impact of incumbent channels on PAL and GAA channels. The impact increases over scale. The ratings indicate the following: 0, no incumbent areas/zones present; 1, only impact is from GWPZs, no impact to PAL channels in the 3550-3650 MHz range; 2, impact is from DPAs, no PPZs present; 3, impact is from PPZs, no DPAs present; 4, worst case, impact is from both DPAs and PPZs.

TABLE 2

Incumbent Impact Rating scale

| | | | | Impact to | |
|---|---|---|---|---|---|
| | | Impact from | | PAL channels | GAA channels |
| Rating scale | PPZ (Permanent) | DPA (Dynamic) | GWPZ | (3550-3650 MHz) | (3650-3700 MHZ) |
| 0 | No | No | No | No | No |
| 1 | No | No | Yes | No | Yes |
| 2 | No | Yes | Yes* | Yes | Yes |
| 3 | Yes | No | Yes* | Yes | Yes |
| 4 | Yes | Yes | Yes* | Yes | Yes |

*GWPZ contribution may or may not apply for all counties.

Analysis

The CBRS channel evaluation tool with Google KML files allows a user to conduct many types of analysis per their own assessment criteria and needs. This section will address high-level nationwide and regional analysis that is very useful to understand the overall impact of incumbent protection to the CBRS county level license areas and resulting CBRS channel availability.

Entire United States

Results of analysis conducted for the entire United States are listed in Table 3 with the following observations.

The 15 channels are entirely unoccupied in 25% of all counties (26% of U.S. area, 9% of the population) (rating 0).

3-5 CBRS (GAA) channels are partially occupied in 24% of all counties (19% of U.S. area, 20% of) (rating 1).

CBRS channels are partially occupied in 31% of all counties (40% of U.S. area, 31% of the population) (rating 2).

Up to 15 CBRS channels are occupied in 3% of all counties (2% of U.S. area, 2% of the population) (rating 3).

Up to 15 CBRS channels are occupied by permanent and dynamic incumbents in 17% of all counties (13% of U.S. area, 38% of the population) (rating 4).

TABLE 3

STATISTICS AND RECOMMENDATIONS
FOR THE ENTIRE UNITED STATES

| Rating | Recommendation/ Observation | Counties 3,233 | Area 9,298,144 km² | Population 324,803,004 |
|---|---|---|---|---|
| 0 | Consider extensive GAA strategy | 25% | 26% | 9% |
| 1 | Consider extensive GAA strategy + Minor PAL channel where needed (near denser pops) | 24% | 19% | 20% |
| 2 | Consider GAA strategy as strong secondary + Pivot to PAL channel as primary | 31% | 40% | 31% |
| 3 | Consider GAA strategy as secondary + Pivot to PAL channelas primary (coverage as criteria) | 3% | 2% | 2% |
| 4 | Strong PAL strategy (for both coverage and capacity) + Minor GAA strategy | 17% | 13% | 38% |

It should be noted that the percent of GAA channel occupancy in GAA channels (rating 1) will reduce over time as wireless ISP licenses expire over time, as shown in FIG. 8.

Populated vs. Rural Areas

Results of analysis conducted for example in populated and rural states are listed in Table 4. New York and Pennsylvania are home to large metropolitan areas, and South Dakota is mainly rural with a low population density.

Results show that every county in New York has incumbents; 48% of counties have a rating of 4, and because the state is near the coast, DPAs impact 87% of counties. In Pennsylvania, only 3% of counties (west of the Appalachian Mountains) have no incumbents; PPZs and DPAs impact 84% and 94% of counties, respectively. Because the 150-MHz CBRS band is heavily used by incumbents on both coasts, overlapping populated and developed areas, deployment of CBRS may face spectrum sharing challenges. In South Dakota, a rural state, 47% of counties have no incumbents. No counties have DPAs or PPZs, but GWPZs impact 53% of counties. The full CBRS band is likely available in rural areas; CBRS may be suitable for these areas because GAA channels are likely available.

Impact of Each Incumbent

Figure 10:
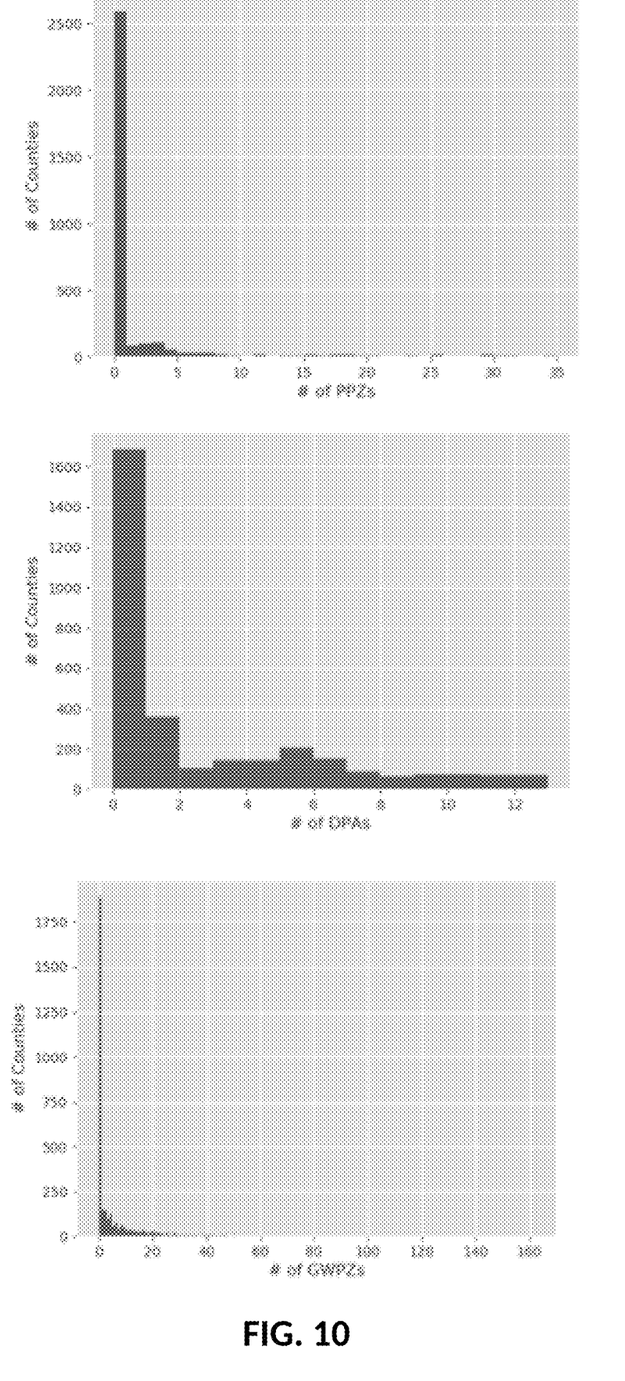
FIG. 10 provides a graphical representation of data from a telecommunication channel evaluation tool, according to the present disclosure, showing the number of counties versus number of Permanent Protection Zones (PPZs), DPAs and GWPZs.

Histograms in FIG. 10 show the results of an analysis conducted on a number of counties encumbered by each incumbent. They compare the number of counties against the number of PPZs, DPAs, and GWPZs. The maximum number of PPZs, DPAs, and GWPZs to impact a county are 35, 12, and 162, respectively. The number of counties not impacted by a PPZ, DPA, or GWPZ are 2,590, 1,686, and 1,891, respectively. Of 3,233 counties, 811 are rated 0; 765 are rated 1; 1,014 are rated 2; 110 are rated 3; and 533 are rated 4.

Analysis of PPZs, which include QZones, EZones, and FSS earth stations:

Impact: 19% counties, 40% population—QZones: 2% (65) counties, 2% population; EZones: 4% (121) counties, 7% population; FSS earth stations: 17% (557) counties, 37% population QZones and EZones are mainly in remote areas with very low population densities FSS earth stations are dominant in PPZs because they are in developed areas. .

TABLE 4

STATISTICS AND RECOMMENDATIONS FOR 3 EXAMPLE STATES

| | | New York | | | Pennsylvania | | | South Dakota | | |
|---|---|---|---|---|---|---|---|---|---|---|
| Rating | Recommendation/ Observation | Counties 62 | Area 126,200 km² | Pop. 19,798,228 | Counties 67 | Area 116,672 km² | Pop. 12,790,505 | Counties 66 | Area 198,418 km² | Pop. 855,444 |
| 0 | Consider extensive GAA strategy | 0% | 0% | 0% | 3% | 4% | 2% | 47% | 64% | 35% |
| 1 | Consider extensive GAA strategy + Minor PAL channel where needed (near denser pops) | 11% | 10% | 11% | 3% | 4% | 2% | 53% | 36% | 65% |
| 2 | Consider GAA strategy as strong secondary + Pivot to PAL channel as primary | 39% | 44% | 12% | 10% | 10% | 2% | 0% | 0% | 0% |
| 3 | Consider GAA strategy as secondary + Pivot to PAL channel as primary (coverage as criteria) | 2% | 3% | 1% | 0% | 0% | 0% | 0% | 0% | 0% |
| 4 | Strong PAL strategy (for both coverage and capacity) + Minor GAA strategy | 48% | 43% | 76% | 84% | 82% | 94% | 0% | 0% | 0% |

Analysis of DPAs:

Impact: 47% counties, 69% population—E-DPAs: 38% (1,226) counties, 59% population; P-DPAs: 27% (867) counties, 45% population DPAs are the largest uncertainty for CBRS because incumbent activities in both frequency and time are unknown.

DPAs do not impact 5 GAA channels in the 3650-3700 MHz range.

GAA deployment may be of more interest than PAL if multiple DPAs impact an area.

Analysis of GWPZs:

Impact: 42% (1,342) counties, 55% population

Markets with severe impact from GWPZs may consider PAL deployments because GWPZs do not impact them.

Counties with no impact from an incumbent:

25% counties, 9% population

Mainly in rural areas (e.g., South Dakota and Idaho)

Internet and phone services with wired links (cable plant, twisted wires or fiber) are too expensive for rural areas.

MSOs may consider using CBRS, especially unlicensed GAA channels, for either fixed or mobile wireless access to cover large, less populated areas.

Market-Specific Analysis

The CBRS channel evaluation tool with KML files can also be used for operator-specific analysis on a served market, set of markets, or geographic region. The tool allows a user to conduct customized analysis per their own assessment criteria and needs. This section will address examples of operator-specific analyses that are very useful when trying to understand the overall impact of incumbent protection on CBRS county-level license areas and the resulting CBRS channel availability.

State Level (Georgia)

An example analysis was conducted on the state of Georgia. Table 5 gives a high-level overview of the 20 most affected counties, including area; population; number of DPAs, PPZs, and GWPZs; and affected PAL and GAA channels for each.

Figure 11:
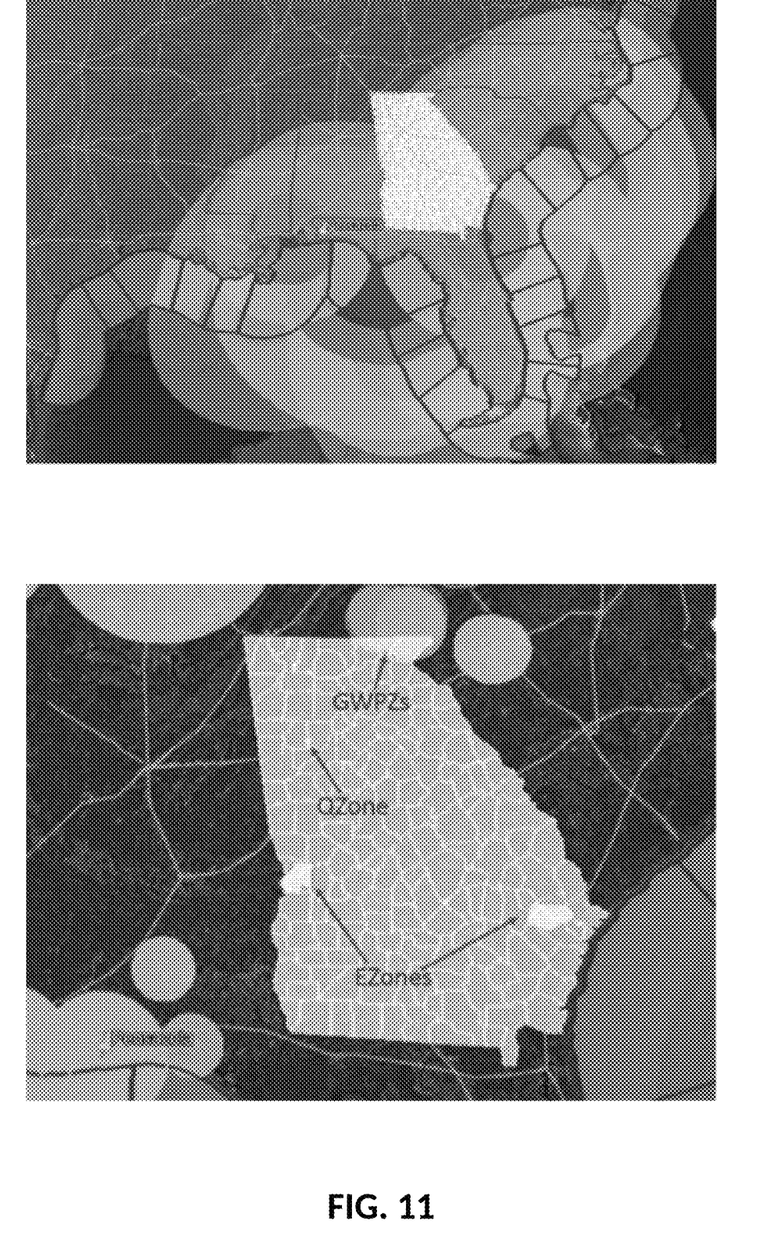
FIG. 11 provides a geospatial representation of data from a telecommunication channel evaluation tool, according to the present disclosure, showing results of impact in Georgia from 11 E-DPAs and 2 EZones, 1 QZone, and 9 GWPZs.

Of the 159 counties in the state, 152 of them overlap with up to 11 E-DPAs (FIG. 11). A single QZone between Cobb and Paulding Counties blocked all 15 CBRS channels, but it covers a small area. In the northeast corner of the state, 9 GWPZs affect 5 counties. Two EZones (FIG. 11) impact 10 PAL channels in 12 counties. No county in Georgia overlaps with an FSS earth station or P-DPA.

The Google Earth® view in FIG. 11, by providing a visual for the shape of the incumbents and the overlapping areas, helps MSOs understand what could happen in their market. The evaluation tool includes additional tabs with more detailed information for each type of incumbent, such as percent of impact area and population, Cat-A or Cat-B CBSD, co-channel or adjacent channel, frequency range of each incumbent, owners and call signs of FSS earth stations, and GWBL licenses.

Most Populated Counties

Figure 12:
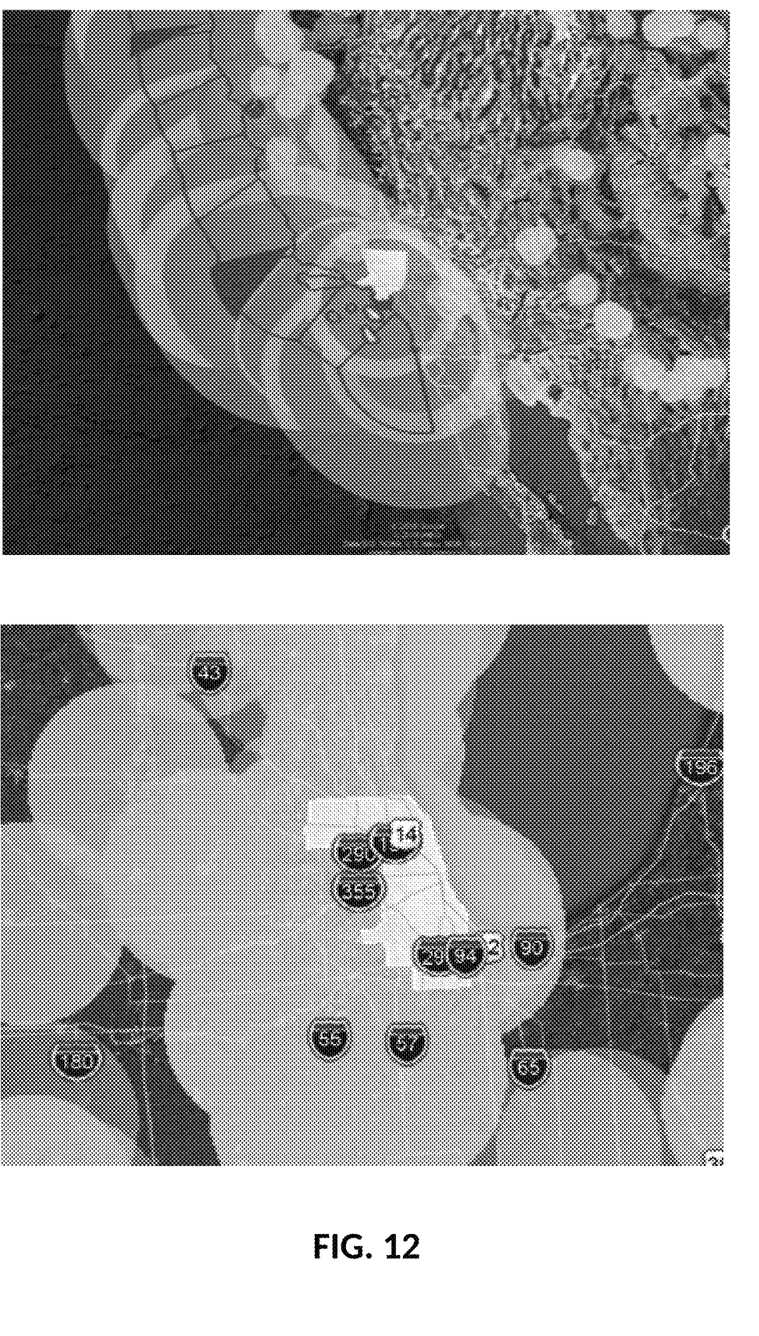
FIG. 12 provides a geospatial representation of data from a telecommunication channel evaluation tool, according to the present disclosure, showing impact results for Los Angeles County, Calif. (top), and Cook County, Ill. (Chicago metro area) (bottom).

Table 6 lists the 20 most populated counties in the United States. The most populated county, Los Angeles, Calif., is surrounded by 7 E-DPAs and 21 PPZs. The PPZs are dominated by FSS earth stations, which make 5 channels in the 3650-3700 MHz range almost unavailable. Because the CBSD may change frequency and power often, the E-DPAs (FIG. 12, top) make it highly probable that 3550-3650 MHz channels will be unavailable and that PAL channel stability will be poor. The Chicago metropolitan area in Cook County, Ill., the second most populated county, does not have any DPAs or PPZs but does have over a hundred GWPZs (FIG. 12, bottom) that make 5 channels in the 3650-3700 MHz range unavailable. A possible solution for CBRS deployment in Chicago would be a deployment in the 3550-3650 MHz range.

TABLE 5

20 counties in Georgia with most Impact from incumbents

| State | County | County (km²) area | Population | Rating scale | No. DPAS of | No. PPZs of | No. of GWPZs | Impact from permanent incumbent | |
|---|---|---|---|---|---|---|---|---|---|
| | | | | | | | | No. of PAL channels | No. of GAA channels |
| GA | Liberty | 1,396.9 | 62,120 | 4 | 7 | 1 | 0 | 10 | 10 |
| GA | Chatham | 1,272.2 | 285,506 | 4 | 6 | 1 | 0 | 10 | 10 |
| GA | Effingham | 1,246.3 | 57,087 | 4 | 6 | 1 | 0 | 10 | 10 |
| GA | Bryan | 1,167.6 | 34,883 | 4 | 6 | 1 | 0 | 10 | 10 |
| GA | Tattnall | 1,259.6 | 25,402 | 4 | 6 | 1 | 0 | 10 | 10 |
| GA | Long | 1,042.3 | 17,857 | 4 | 6 | 1 | 0 | 10 | 10 |
| GA | Evans | 482.1 | 10,757 | 4 | 6 | 1 | 0 | 10 | 10 |
| GA | Stewart | 1,196.2 | 5,832 | 4 | 5 | 1 | 0 | 10 | 10 |
| GA | Marion | 948.1 | 8,558 | 4 | 4 | 1 | 0 | 10 | 10 |
| GA | Talbot | 1,018.3 | 6,423 | 4 | 4 | 1 | 0 | 10 | 10 |
| GA | Muscogee | 570.3 | 198,647 | 4 | 3 | 1 | 0 | 10 | 10 |
| GA | Chattahoochee | 647.7 | 11,096 | 4 | 3 | 1 | 0 | 10 | 10 |
| GA | Cobb | 888.7 | 739,072 | 4 | 2 | 1 | 0 | 10 | 15 |
| GA | Paulding | 810.7 | 152,399 | 4 | 2 | 1 | 0 | 0 | 15 |
| GA | Lowndes | 1,317.4 | 113,941 | 2 | 8 | 0 | 0 | 0 | 0 |
| GA | Dougherty | 863.9 | 91,522 | 2 | 8 | 0 | 0 | 0 | 0 |
| GA | Glynn | 1,201.3 | 83,467 | 2 | 8 | 0 | 0 | 0 | 0 |
| GA | Camden | 1,769.9 | 52,252 | 2 | 8 | 0 | 0 | 0 | 0 |
| GA | Thomas | 1,425.3 | 44,909 | 2 | 8 | 0 | 0 | 0 | 0 |
| GA | Ware | 2,339.9 | 35,688 | 2 | 8 | 0 | 0 | 0 | 0 |

TABLE 6

| | | | | | No. of | No. of | No. of | Impact from permanent incumbent | |
| | | | | | | | | No. of PAL | No. of GAA |
| State | County | County area (km²) | Population | Rating scale | DPAs | PPZs | GWPZs | channels | channels |
|---|---|---|---|---|---|---|---|---|---|
| CA | Los Angeles | 10,576.2 | 10,105,722 | 4 | 7 | 21 | 1 | 5 | 10 |
| IL | Cook | 2,466.8 | 5,238,541 | 1 | 0 | 0 | 101 | 0 | 5 |
| TX | Harris | 4,574.2 | 4,525,519 | 2 | 5 | 0 | 19 | 0 | 5 |
| AZ | Maricopa | 23,792.6 | 4,155,501 | 2 | 1 | 0 | 77 | 0 | 5 |
| CA | San Diego | 10,988.6 | 3,283,665 | 4 | 7 | 13 | 4 | 3 | 8 |
| CA | Orange | 2,061 | 3,155,816 | 4 | 6 | 27 | 0 | 5 | 10 |
| FL | Miami-Dade | 5,216.7 | 2,702,602 | 4 | 10 | 2 | 0 | 3 | 8 |
| NY | Kings | 212.7 | 2,635,121 | 4 | 9 | 31 | 0 | 5 | 10 |
| TX | Dallas | 2,344.1 | 2,552,213 | 2 | 1 | 0 | 28 | 0 | 5 |
| CA | Riverside | 18,836.3 | 2,355,002 | 4 | 7 | 28 | 8 | 10 | 15 |
| NY | Queens | 322.5 | 2,339,280 | 4 | 9 | 31 | 0 | 5 | 10 |
| CA | San Bernardino | 51,845.3 | 2,121,220 | 4 | 7 | 28 | 10 | 10 | 15 |
| WA | King | 5,635.2 | 2,118,119 | 4 | 3 | 7 | 4 | 3 | 8 |
| NV | Clark | 20,775.1 | 2,112,436 | 4 | 2 | 1 | 4 | 10 | 15 |
| TX | Tarrant | 2,327.7 | 1,983,675 | 2 | 1 | 0 | 31 | 0 | 5 |
| CA | Santa Clara | 3,351.2 | 1,911,226 | 4 | 6 | 4 | 2 | 3 | 8 |
| TX | Bexar | 3,242.8 | 1,892,004 | 2 | 3 | 0 | 14 | 0 | 5 |
| FL | Broward | 3,164.8 | 1,890,416 | 4 | 10 | 2 | 0 | 3 | 8 |
| MI | Wayne | 1,633.8 | 1,763,822 | 1 | 0 | 0 | 3 | 0 | 3 |
| NY | New York | 82.5 | 1,653,877 | 4 | 9 | 17 | 0 | 5 | 10 |

Recommendations

A CBRS channel evaluation tool with KML files was developed to analyze channel occupancy by incumbents. The tool and KML files can be used to analyze several aspects of CBRS network deployment including business cases, deployment planning, and operations.

The CBRS channel evaluation tool benefits the following activities:

planning PAL auction strategy;
evaluating channel availability at the county level, with population and area data, for business case analyses;
using PAL/GAA channel availability information for deployment planning;
evaluating PAL channel stability near (dynamic) incumbents;
studying PAL/PPA impact on incumbents;
maintaining awareness of SAS complexity;
carrying out competitive analysis (i.e., to identify mobile operator markets of spectrum deficiency where they are likely to pursue PALs and to compare with internal operator target market opportunities); and
driving SAS channel planning efficiency of the CBRS band with SAS vendors and standards organizations (i.e., through improved propagation models, higher resolution terrain/clutter data, and an interference analysis framework).

It should be noted that this analysis represents a 2-dimensional worst-case study based on FCC-defined boundaries and definitions. Other tools (e.g., for use by SAS vendors) can use a 3-dimensional GIS-based tool to conduct more pragmatic analyses with more complex calculations. It is expected that the results will be more accurate and granular (i.e., at sub-county level such as down to a 30-m pixel). This tool can be used to collaborate with an operator's SAS vendor to understand potential risks and tradeoffs of CBRS channel occupancy in targeted market opportunities.

STATEMENTS REGARDING INCORPORATION BY REFERENCE AND VARIATIONS

All references cited throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments, exemplary embodiments and optional features, modification and variation of the concepts herein disclosed can be resorted to by those skilled in the art, and that such modifications and variations are considered to be within the scope of this invention as defined by the appended claims. The specific embodiments provided herein are examples of useful embodiments of the invention and it will be apparent to one skilled in the art that the invention can be carried out using a large number of variations of the devices, device components, and method steps set forth in the present description. As will be apparent to one of skill in the art, methods, software and apparatus/devices can include a large number of optional elements and steps. All art-known functional equivalents of materials and methods are intended to be included in this disclosure. Nothing herein is to be construed as an admission that the invention is not entitled to antedate such disclosure by virtue of prior invention.

When a group of substituents is disclosed herein, it is understood that all individual members of that group and all subgroups are disclosed separately. When a Markush group or other grouping is used herein, all individual members of the group and all combinations and subcombinations possible of the group are intended to be individually included in the disclosure.

It must be noted that as used herein and in the appended claims, the singular forms "a", "an", and "the" include plural reference unless the context clearly dictates otherwise. Thus, for example, reference to "a processor" includes a plurality of such processors and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably. The expression "of any of claims XX-YY" (wherein XX and YY refer to claim numbers) is intended to provide a multiple dependent claim in the alternative form, and in some embodiments is interchangeable with the expression "as in any one of claims XX-YY."

Unless defined otherwise, all technical and scientific terms used herein have the same meanings as commonly understood by one of ordinary skill in the art to which this invention belongs. Although any methods and materials similar or equivalent to those described herein can be used in the practice or testing of the present invention, the preferred methods and materials are described.

Whenever a range is given in the specification, for example, a range of integers, a temperature range, a time range, a composition range, or concentration range, all intermediate ranges and subranges, as well as all individual values included in the ranges given are intended to be included in the disclosure. As used herein, ranges specifically include the values provided as endpoint values of the range. As used herein, ranges specifically include all the integer values of the range. For example, a range of 1 to 100 specifically includes the end point values of 1 and 100. It will be understood that any subranges or individual values in a range or subrange that are included in the description herein can be excluded from the claims herein.

As used herein, "comprising" is synonymous and can be used interchangeably with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" can be replaced with either of the other two terms. The invention illustratively described herein suitably can be practiced in the absence of any element or elements, limitation or limitations which is/are not specifically disclosed herein.

What is claimed is:

1. A telecommunication radio frequency (RF) channel evaluation tool for identifying restrictions associated with incumbent users of spectral bandwidth within a shared spectrum and assessing channel availability for third party transmitters in the shared spectrum, the evaluation tool comprising:

a database comprising (A) at least one incumbent user's location and corresponding regulatory setback markers defining a perimeter of a protection area for the incumbent user's location, population density for a geographic area containing at least a portion of the protection area, regulatory restrictions applicable in the protection area on third party transmissions, restrictions in neighboring geographic areas, and (B) size of the geographic area, channel occupancy, number of incumbents that impact the third party transmissions in a geospatial area, type of incumbent user, and/or quantification of area and population affected by the regulatory restrictions.

2. The channel evaluation tool of claim 1, wherein the channel is in the citizens broadband radio service (CBRS) band and the incumbent users are CBRS incumbent users.

3. The channel evaluation tool of claim 1, wherein the regulatory restrictions comprise transmission frequency restrictions, transmission power level restrictions, and/or transmission location restrictions.

4. The channel evaluation tool of claim 1, wherein the protection area comprises one or more extension zones.

5. The channel evaluation tool of claim 1, wherein data within the database is presented as a spreadsheet, a graphical representation, or a geospatial representation.

6. The channel evaluation tool of claim 5, wherein the geospatial representation is a physical or electronic geographic map providing a two-dimensional or three-dimensional representation of terrain.

7. The channel evaluation tool of claim 1, wherein the incumbent user is selected from the group consisting of a military user, a civilian service, a wireless Internet service provider (WISP), and a research body.

8. The channel evaluation tool of claim 1, further comprising an impact rating assigned to at least a portion of the geographic area.

9. The channel evaluation tool of claim 1, wherein the regulatory setback boundaries are defined by geospatial coordinates or distance(s) from the incumbent user's location.

10. A method of creating a telecommunication radio frequency (RF) channel evaluation tool, the method comprising:

identifying (i) at least one incumbent user's location and (ii) corresponding regulatory setback markers defining a perimeter of a protection area for the incumbent user's location, (iii) population density for a geographic area containing at least a portion of the protection area, (iv) regulatory restrictions applicable in the protection area on third party transmissions, (v) restrictions in neighboring geographic areas , and one or more of (vi) a size of the geographic area, (vii) channel occupancy, and (viii) a quantity of area and population affected by the regulatory restrictions; and compiling (i)-(viii) into a database.

11. The method of claim 10, wherein the regulatory restrictions comprise transmission frequency restrictions, transmission power level restrictions, and/or transmission location restrictions.

12. The method of claim 10, wherein the protection area comprises one or more extension zones.

13. The method of claim 10 further comprising assessing channel availability for third party transmitters based on the regulatory restrictions.

14. The method of claim 10 further comprising presenting data within the database as a spreadsheet, a graphical representation, or a geospatial representation.

15. The method of claim 14, wherein the geospatial representation is a physical or electronic geographic map providing a two-dimensional or three-dimensional representation of terrain.

16. The method of claim 10, wherein the incumbent user is selected from the group consisting of a military user, a civilian service, a wireless Internet service provider (WISP), and a research body.

17. The method of claim 10 further comprising assigning an impact rating to at least a portion of the geographic area.

18. The method of claim 10, wherein the regulatory setback boundaries are defined by geospatial coordinates or distance(s) from the incumbent user's location.

* * * * *